(12) United States Patent
Camp et al.

(10) Patent No.: US 9,904,607 B2
(45) Date of Patent: Feb. 27, 2018

(54) LOGICAL TO PHYSICAL TABLE RESTORATION FROM STORED JOURNAL ENTRIES

(71) Applicant: International Business Machines Corporation, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Roman A. Pletka, Uster (CH); Lincoln T. Simmons, Houston, TX (US); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/940,427

(22) Filed: Nov. 13, 2015

(65) Prior Publication Data

US 2017/0139781 A1 May 18, 2017

(51) Int. Cl.
*G06F 11/00* (2006.01)
*G06F 11/14* (2006.01)
*G06F 3/06* (2006.01)

(52) U.S. Cl.
CPC .......... *G06F 11/1469* (2013.01); *G06F 3/065* (2013.01); *G06F 3/0619* (2013.01);
(Continued)

(58) Field of Classification Search
CPC .................................................. G06F 11/1469
See application file for complete search history.

(56) References Cited

U.S. PATENT DOCUMENTS 5,724,581 A * 3/1998 Kozakura ........... G06F 11/1448
707/674
7,185,227 B2 * 2/2007 Eguchi .................. G06F 11/142
707/999.202
(Continued)

FOREIGN PATENT DOCUMENTS

CN 101755257 A 6/2010
JP 4890033 B2 3/2012

OTHER PUBLICATIONS

Daly et al., "Cache Restoration for Highly Partitioned Virtualized Systems," 18th International Symposium on High Performance Computer Architecture (HPCA), IEEE, Feb. 2012, pp. 1-10.
(Continued)

*Primary Examiner* — Christopher McCarthy
(74) *Attorney, Agent, or Firm* — Zilka-Kotab, P.C.

(57) ABSTRACT

A controller-implemented method, according to one embodiment, includes: restoring a valid snapshot of a LPT from the non-volatile random access memory, examining each journal entry from at least one journal beginning with a most recent one of the journal entries in a most recent one of the at least one journal and working towards an oldest one of the journal entries in an oldest one of the at least one journal, the journal entries corresponding to updates made to one or more entries of the LPT, determining whether a current LPT entry which corresponds to a currently examined journal entry has already been updated, using the currently examined journal entry to update the current LPT entry in response to determining that the current LPT entry has not already been updated, and discarding the currently examined journal entry in response to determining that the current LPT entry has already been updated.

20 Claims, 10 Drawing Sheets

(52) U.S. Cl.
CPC ........ *G06F 3/0679* (2013.01); *G06F 11/1451* (2013.01); *G06F 2201/805* (2013.01); *G06F 2201/84* (2013.01); *G06F 2201/85* (2013.01)

(56) References Cited

U.S. PATENT DOCUMENTS

| | | | |
|---|---|---|---|
| 7,822,892 B2 | 10/2010 | Boyd et al. | |
| 8,112,574 B2* | 2/2012 | Lee ................ | G06F 12/0246 202/206 |
| 8,589,768 B2 | 11/2013 | Masuo | |
| 8,631,273 B2 | 1/2014 | Frost et al. | |
| 8,775,772 B2 | 7/2014 | Fuxa et al. | |
| 8,972,651 B2* | 3/2015 | Kawamura ......... | G06F 12/0246 711/102 |
| 9,389,792 B1* | 7/2016 | Camp ................. | G06F 3/0619 |
| 9,411,717 B2* | 8/2016 | Goss .................. | G06F 11/1012 |
| 9,524,116 B1* | 12/2016 | Camp ................. | G06F 3/0619 |
| 9,529,537 B2* | 12/2016 | Kawamura ......... | G06F 12/0246 |
| 9,697,116 B2* | 7/2017 | Kim ................... | G06F 12/0246 |
| 2005/0182892 A1* | 8/2005 | Nakanishi ........... | G06F 11/1435 711/103 |
| 2007/0168634 A1 | 7/2007 | Morishita et al. | |
| 2009/0024676 A1 | 1/2009 | Boyd et al. | |
| 2009/0089614 A1* | 4/2009 | Eguchi ................ | G06F 11/142 714/15 |
| 2013/0091320 A1* | 4/2013 | Kawamura ......... | G06F 12/0246 711/103 |
| 2013/0198439 A1 | 8/2013 | Kurotsuchi et al. | |
| 2015/0046665 A1* | 2/2015 | Higgins ............... | G06F 3/0619 711/158 |
| 2015/0046670 A1* | 2/2015 | Kim .................... | G06F 12/0246 711/207 |
| 2015/0127896 A1* | 5/2015 | Kawamura ......... | G06F 12/0246 711/103 |
| 2016/0246530 A1* | 8/2016 | Mylavarapu ........ | G06F 3/0625 |
| 2016/0283401 A1* | 9/2016 | Virajamangala ...... | G06F 12/122 |
| 2016/0299710 A1* | 10/2016 | Chang ................. | G06F 3/0619 |
| 2017/0075807 A1* | 3/2017 | Tomlin ............... | G06F 12/0253 |

OTHER PUBLICATIONS

Anonymous, "Providing Security to paged out pages to Virtual IO Server paging space partition in Active Memory Sharing environment," ip.com, Apr. 24, 2014, pp. 1-9.
Camp et al., U.S. Appl. No. 15/824,931, dated Nov. 28, 2017.

* cited by examiner

LOGICAL TO PHYSICAL TABLE RESTORATION FROM STORED JOURNAL ENTRIES

BACKGROUND

The present invention relates to data storage systems, and more particularly, this invention relates to restoring logical to physical tables (LPTs) while preventing unnecessary updates from stored journal entries.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the LPT.

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A controller-implemented method for restoring a snapshot from non-volatile random access memory using journal entries, according to one embodiment, includes: restoring, by the controller, a valid snapshot of a logical to physical table (LPT) from the non-volatile random access memory, examining, by the controller, each journal entry from at least one journal beginning with a most recent one of the journal entries in a most recent one of the at least one journal and working towards an oldest one of the journal entries in an oldest one of the at least one journal, the journal entries corresponding to one or more updates made to one or more entries of the LPT, determining, by the controller, whether a current LPT entry which corresponds to a currently examined journal entry has already been updated, using, by the controller, the currently examined journal entry to update the current LPT entry in response to determining that the current LPT entry has not already been updated, and discarding the currently examined journal entry in response to determining that the current LPT entry has already been updated.

A computer program product for restoring a snapshot from non-volatile random access memory using journal entries, according to another embodiment, includes a computer readable storage medium having program instructions embodied therewith, the program instructions readable and/or executable by a controller to cause the controller to: restore, by the controller, a valid snapshot of a logical to physical table from the non-volatile random access memory, examine, by the controller, each journal entry from at least one journal beginning with a most recent one of the journal entries in a most recent one of the at least one journal and working towards an oldest one of the journal entries in an oldest one of the at least one journal, the journal entries corresponding to one or more updates made to one or more entries of the logical to physical table, determine, by the controller, whether a current LPT entry which corresponds to a currently examined journal entry has already been updated, use, by the controller, the currently examined journal entry to update the current LPT entry in response to determining that the current LPT entry has not already been updated, and discard, by the controller, the currently examined journal entry in response to determining that the current LPT entry has already been updated.

A system, according to yet another embodiment, includes: a plurality of non-volatile random access memory blocks configured to store data, and a controller and logic integrated with and/or executable by the controller for restoring a snapshot from non-volatile random access memory using journal entries, the logic being configured to: restore, by the controller, a valid snapshot of a logical to physical table from the non-volatile random access memory, examine, by the controller, each journal entry from at least one journal beginning with a most recent one of the journal entries in a most recent one of the at least one journal and working towards an oldest one of the journal entries in an oldest one of the at least one journal, the journal entries corresponding to one or more updates made to one or more LPT entries of the logical to physical table, inspect, by the controller, a flag corresponding to a current LPT entry which corresponds to a currently examined journal entry, the flag indicating whether the current LPT entry has already been updated, determine, by the controller, whether the current LPT entry has already been updated, use, by the controller, the currently examined journal entry to update the current LPT entry in response to determining that the current LPT entry has not already been updated, set, by the controller, the flag in response to using the journal entry to update the current LPT entry, and discard, by the controller, the currently examined journal entry in response to determining that the current LPT entry has already been updated. The journal entries include a physical address and a logical address. Moreover, the at least one journal is stored in the non-volatile random access memory.

Other aspects and embodiments of the present invention will become apparent from the following detailed description, which, when taken in conjunction with the drawings, illustrate by way of example the principles of the invention.

DETAILED DESCRIPTION

Figure 1:
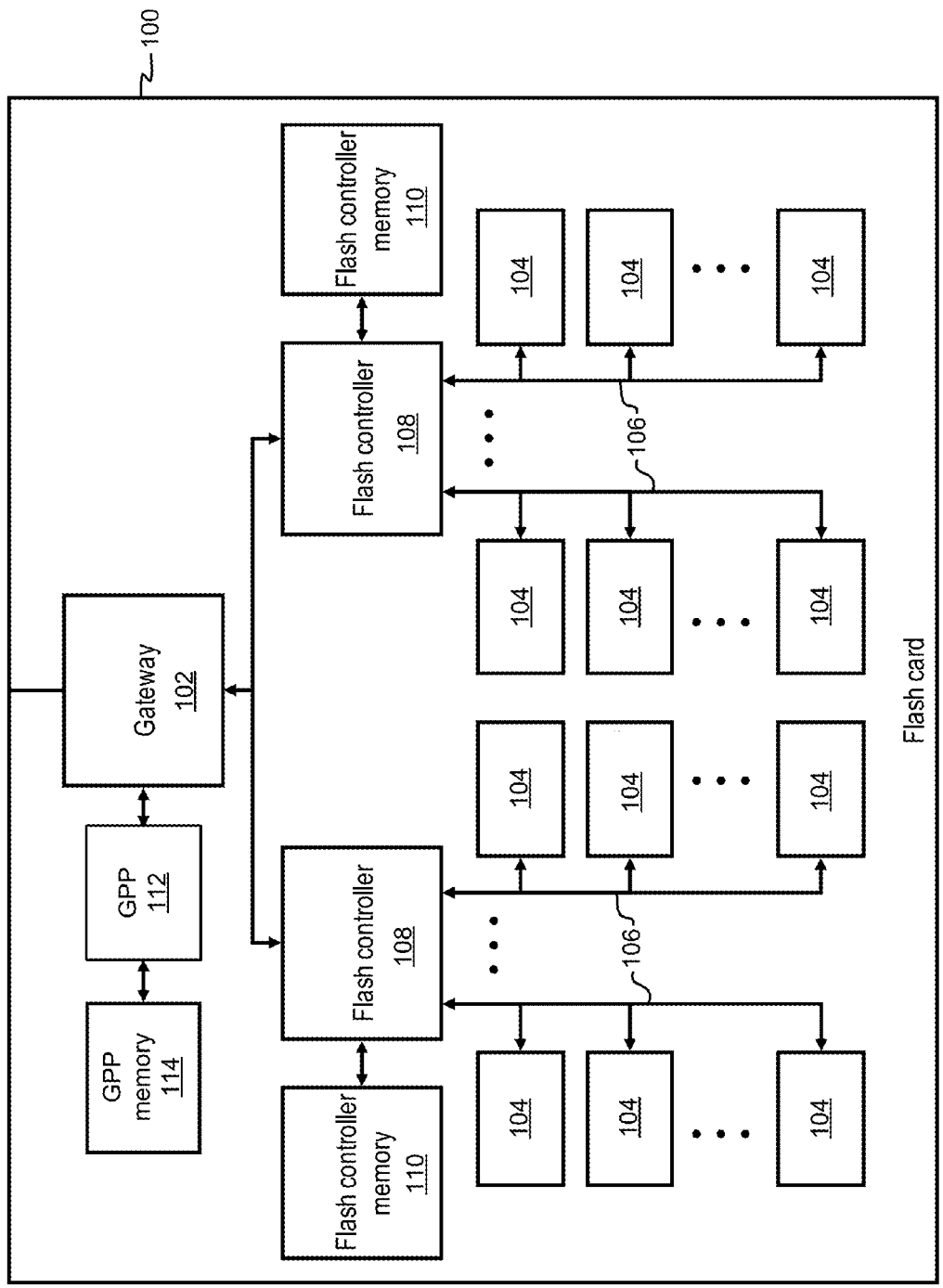
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a controller-implemented method for restoring a snapshot from non-volatile random access memory using journal entries, includes: restoring, by the controller, a valid snapshot of a logical to physical table (LPT) from the non-volatile random access memory, examining, by the controller, each journal entry from at least one journal beginning with a most recent one of the journal entries in a most recent one of the at least one journal and working towards an oldest one of the journal entries in an oldest one of the at least one journal, the journal entries corresponding to one or more updates made to one or more entries of the LPT, determining, by the controller, whether a current LPT entry which corresponds to a currently examined journal entry has already been updated, using, by the controller, the currently examined journal entry to update the current LPT entry in response to determining that the current LPT entry has not already been updated, and discarding the currently examined journal entry in response to determining that the current LPT entry has already been updated.

In another general embodiment, a computer program product for restoring a snapshot from non-volatile random access memory using journal entries, includes a computer readable storage medium having program instructions embodied therewith, the program instructions readable and/or executable by a controller to cause the controller to: restore, by the controller, a valid snapshot of a logical to physical table from the non-volatile random access memory, examine, by the controller, each journal entry from at least one journal beginning with a most recent one of the journal entries in a most recent one of the at least one journal and working towards an oldest one of the journal entries in an oldest one of the at least one journal, the journal entries corresponding to one or more updates made to one or more entries of the logical to physical table, determine, by the controller, whether a current LPT entry which corresponds to a currently examined journal entry has already been updated, use, by the controller, the currently examined journal entry to update the current LPT entry in response to determining that the current LPT entry has not already been updated, and discard, by the controller, the currently examined journal entry in response to determining that the current LPT entry has already been updated.

In yet another general embodiment, a system includes: a plurality of non-volatile random access memory blocks configured to store data, and a controller and logic integrated with and/or executable by the controller for restoring a snapshot from non-volatile random access memory using journal entries, the logic being configured to: restore, by the controller, a valid snapshot of a logical to physical table from the non-volatile random access memory, examine, by the controller, each journal entry from at least one journal beginning with a most recent one of the journal entries in a most recent one of the at least one journal and working towards an oldest one of the journal entries in an oldest one of the at least one journal, the journal entries corresponding to one or more updates made to one or more LPT entries of the logical to physical table, inspect, by the controller, a flag corresponding to a current LPT entry which corresponds to a currently examined journal entry, the flag indicating whether the current LPT entry has already been updated, determine, by the controller, whether the current LPT entry has already been updated, use, by the controller, the currently examined journal entry to update the current LPT entry in response to determining that the current LPT entry has not already been updated, set, by the controller, the flag in response to using the journal entry to update the current LPT entry, and discard, by the controller, the currently examined journal entry in response to determining that the current LPT entry has already been updated. The journal entries include a physical address and a logical address. Moreover, the at least one journal is stored in the non-volatile random access memory.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106. NVRAM memory modules 104 may also be referred to herein as NVRAM blocks which are preferably configured to store data.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
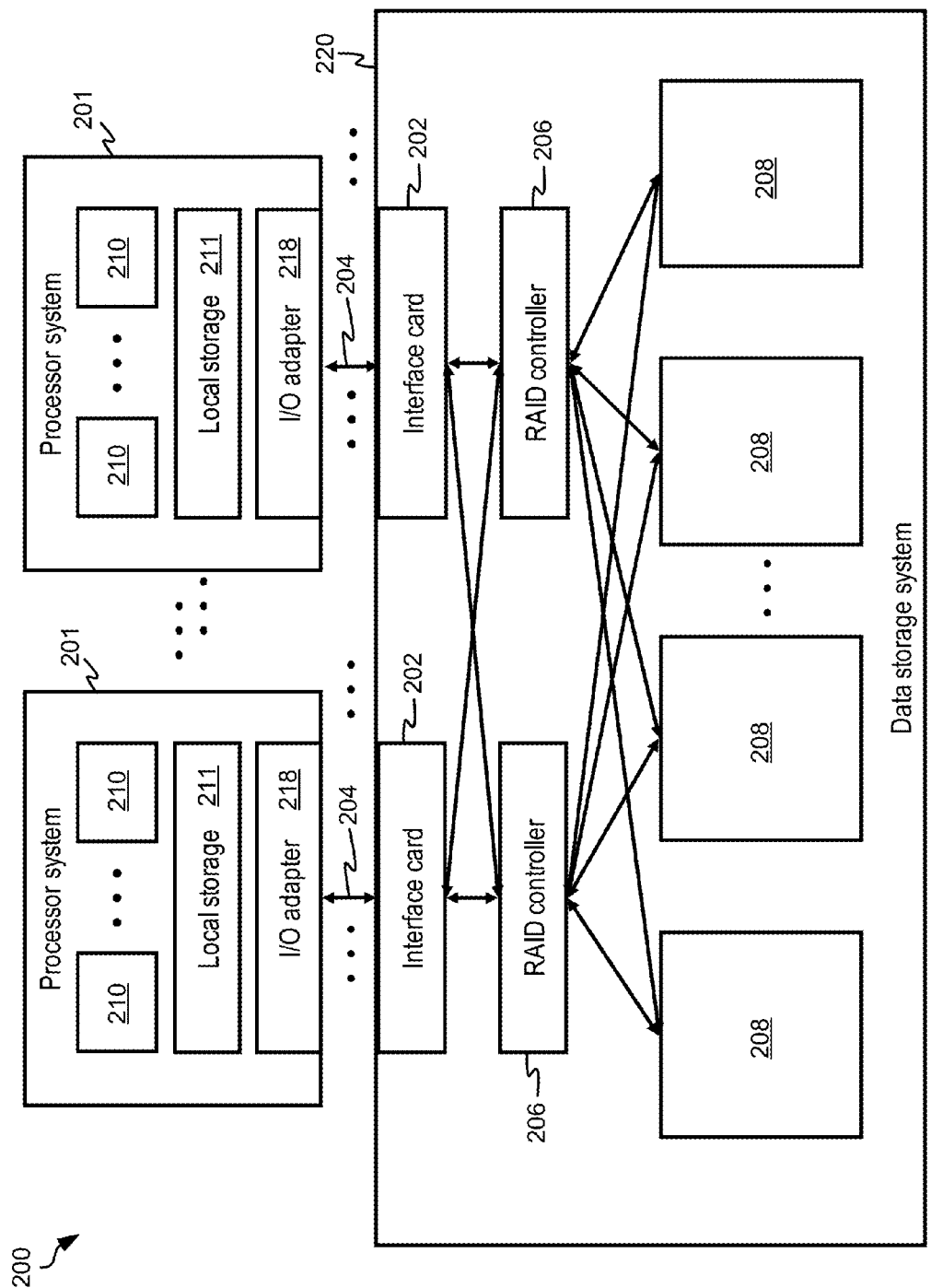
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, LEBs may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification.

The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the heat of a logical page may involve, for instance, allocating a certain number of bits in the LPT mapping entry for the page to keep track of how many read operations the page has seen in a certain time period or window. However, it should be noted that the number of read requests to and/or read operations performed on a memory block may not come into play when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore the write amplification incurred by performing garbage collection is much lower for embodiments implementing heat segregation.

Secondly, the relative heat of data can be utilized for wear leveling purposes. For example, hot data may be placed in younger (e.g., healthier) memory blocks, while cold data may be placed on older (e.g., less healthy) memory blocks relative to those younger memory blocks. Thus, the rate at which relatively older blocks are exposed to wear is effectively slowed, thereby improving the lifetime of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
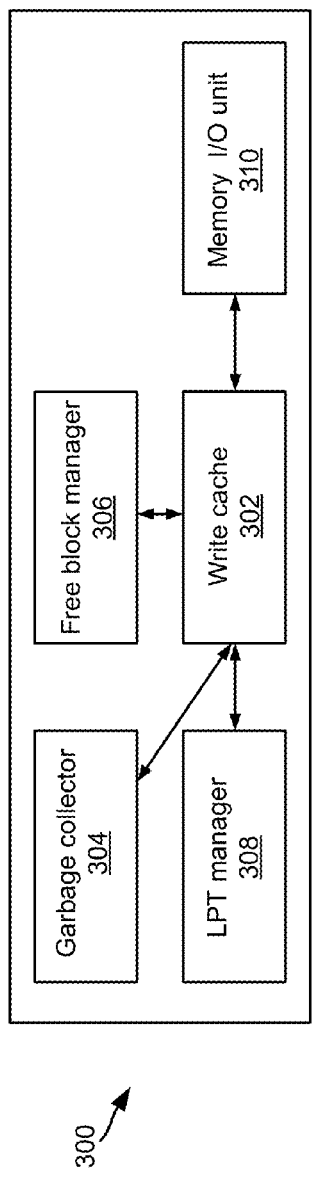
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
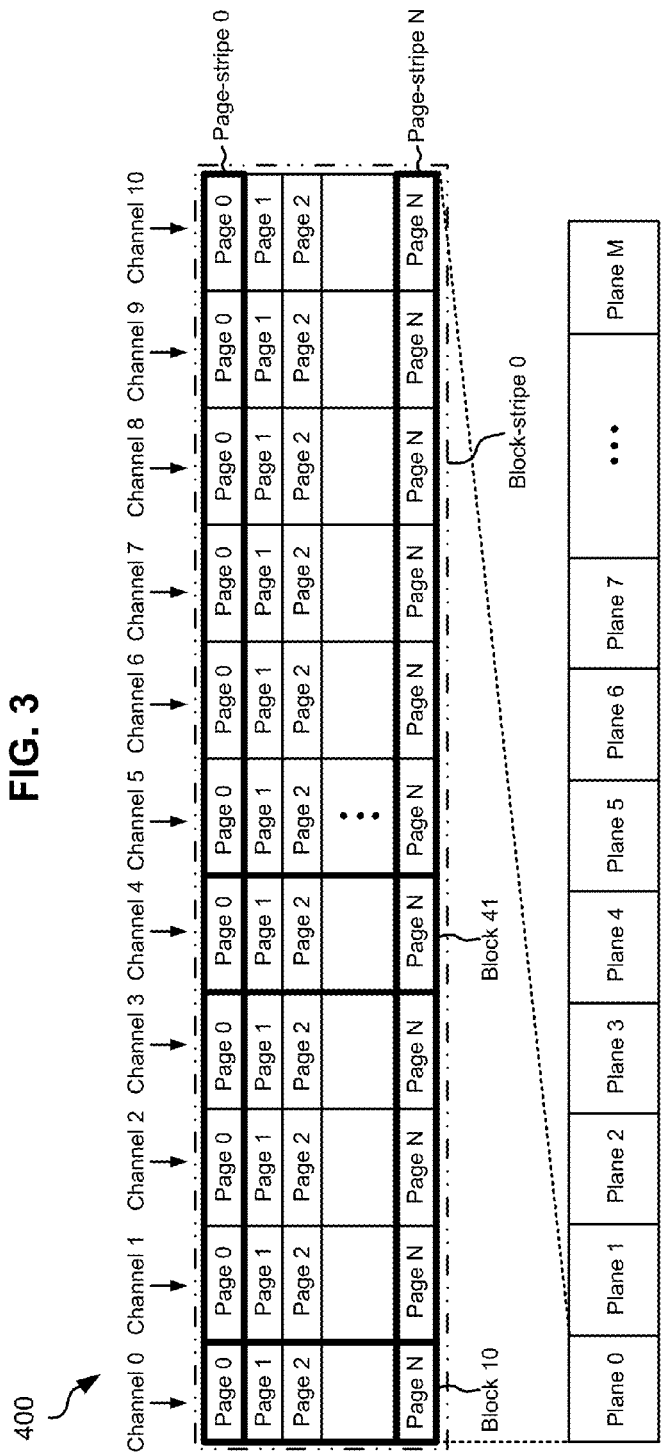
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels, which is also referred to herein simply as plane. When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of Plane 0 may constitute a unique block when implemented in a cache architecture. Similarly, each channel may correspond to a single, individual block. For example, looking to conceptual diagram 400, Block 10 includes all pages (Page 0 through Page N) in Channel 0 while Block 41 corresponds to all pages in Channel 4, and so on.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes. It follows that each plane may include a block-stripe. Thus, according to an illustrative embodiment, Block 0 through Block 10 may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Logical to Physical Table Restoration

As alluded to above, data access related to a memory device, e.g., a flash memory device, may be implemented using a logical block addressing system, e.g., to facilitate access to data. In a logical block addressing system-enabled memory device, a logical block address (LBA) can be logically related to a physical block address (PBA). The use of a LBA enables access to a PBA through translation of the "logical" storage location address to and/or from a "physical" storage location address. Thus, an address translation component (e.g., a processor, a controller, etc.) may, in the background, associate changing PBAs with a LBA.

With increasing capacity of memory, the LPT used to map logical addresses to physical addresses, grows as well. With increased size, it becomes increasingly difficult to perform successful backups of all entries in an LPT to permanent storage upon a power loss. However, various embodiments described herein may use journal entries of LPT entry updates to assist in recovering an LPT, e.g., despite whether the whole LPT was successfully backed up at a power loss, as will be described in further detail below.

Figure 5:
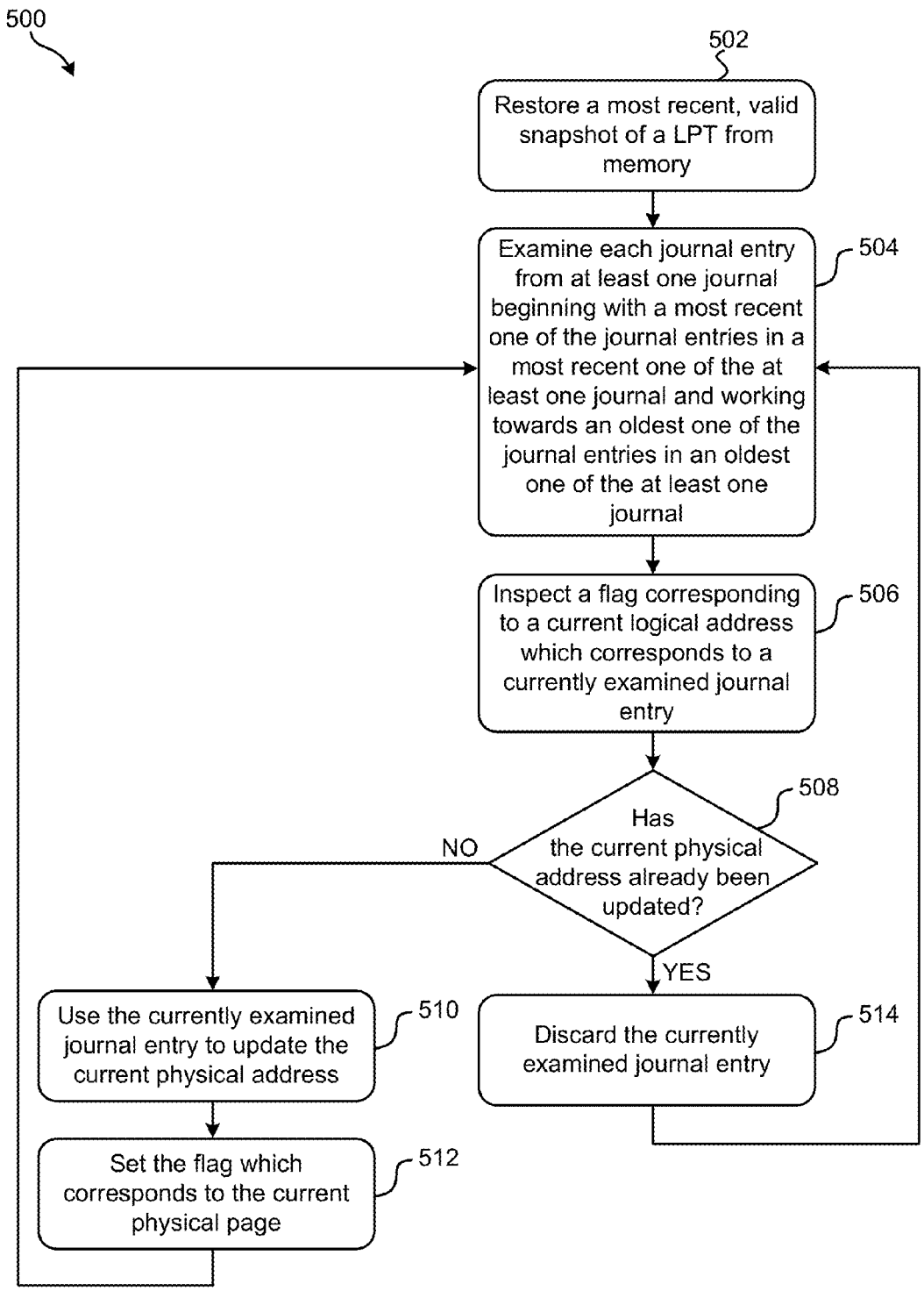
FIG. 5 is a flowchart of a method, in accordance with one embodiment.

Now referring to FIG. 5, a flowchart of a method 500 for restoring a snapshot from NVRAM using journal entries is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, Operation 502 of method 500 includes restoring a most recent, valid snapshot of a LPT from memory, e.g., NVRAM. Snapshots of the LPT may be stored in NVRAM, e.g., a plurality of NVRAM memory modules 104 as shown in FIG. 1. According to an illustrative approach, which is in no way intended to limit the invention, NVRAM may include Flash memory. The process associated with restoring a snapshot may include restoring LPT entries one-by-one, or in batches. The restore process may thereby reset any associated flags for each LPT entry at the same time, e.g., such that the number of memory updates is minimized, as will be described in further detail below.

However, when an LPT is managed in a volatile memory such as RAM (e.g., SRAM, DRAM, etc.), the content stored in the LPT may be lost when operating power is cut to the RAM, e.g., as a result of a power loss. Accordingly, snapshots of a LPT may be periodically taken and stored in non-volatile memory for future use, where such snapshots may be taken using known procedures as would be appreciated by one skilled in the art upon reading the present description. As such, an LPT snapshot may provide accurate documentation of the entries included in an LPT at a given point in time, and therefore may be used for recovery purposes, as a reference, for documentation, etc. It follows that in preferred approaches, the restored snapshot may be used to repopulate a LPT such that it replicates the entries of the LPT at a point in time when the snapshot was taken.

Ideally a snapshot would be updated such that a current and accurate representation of the LPT is always available. However, this is not practical as snapshots may capture all information stored in an LPT at a given time, thereby using processing power, memory, etc. Thus, the frequency at which LPT snapshots are captured may vary depending on the particular embodiment. For example, a lower frequency at which LPT snapshots are captured may be adopted for embodiments having a LPT having a large amount of entries and a low amount of free processing power and/or memory to store the LPT. Alternatively, snapshots of a LPT having a smaller amount of entries and a high amount of updates may be taken more frequently.

Journals may be used to document changes to the entries of a LPT (e.g., write or rewrite operations) which occur between snapshots. Accordingly, it is preferred that journals are stored in NVRAM as well, or another local, preferably non-volatile memory location. Journal entries stored in a journal may include the physical address as well as the logical address associated with a change (e.g., update) made to each of the LPT entries. Therefore, journals may also affect the frequency at which snapshots of a LPT are taken. For example, less frequent snapshots of an LPT may be taken when journals are able to accurately track the updates made to the entries thereof. Accordingly, the tradeoff between snapshot processing requirements and journal size requirements may be weighed in determining a desired frequency at which each are repeatedly taken.

It follows that when a snapshot is taken and validated (e.g., completed), some of the previously kept journals may become redundant as the new snapshot embodies a current, accurate representation of the entries included in a LPT. Thus, journals completed prior to the starting point of a snapshot may be erased when the snapshot is successfully completed, e.g., to free space in memory. However, in other approaches journals may be retained even after subsequent snapshots are taken of the LPT.

Referring still to method 500, operation 504 includes examining (e.g., replaying) each journal entry from at least one journal. As mentioned above, each journal entry corresponds to an update made to a given entry of the LPT. Thus, the journal entries correspond to one or more updates made to one or more entries of the LPT. Also, journal entries preferably include the physical address as well as the logical address associated with a change (e.g., update) made to each of the LPT entries. Thus, a journal entry may be used to identify both the physical location as well as the logical address corresponding to a change made to memory.

Moreover, the number of journals retained in memory may depend on the desired embodiment. In an attempt to prevent unnecessary processing consumption, it is preferred that the at least one journal examined in operation 504 includes the journals taken after (later in time than) the most recent, valid snapshot. Thus, journal entries which correspond to a point in time prior to the latest LPT snapshot and which have already been implemented in the LPT snapshot, are desirably not examined. Similarly, journal entries of a particular LBA which correspond to a point in time prior to the latest entry for the same LBA in any journal, are desirably not examined as well. However, more journals may be examined in other approaches, e.g., if a most recent, valid snapshot is not available, to verify entries populated in a repaired LPT from a snapshot, etc.

In conventional attempts, the latest LPT snapshot was restored after a loss (e.g., power loss), and journal entries were intuitively replayed and applied in the same order as they were initially logged to preserve the order in which they were originally added to the LPT prior to the loss. However, each journal entry updates a different location in memory, and includes a costly read-modify-write operation to actually perform the update of the entry. Moreover, if multiple updates are performed on the same logical address, each subsequent update overwrites the previous one. If follows that conventional attempts to recover an LPT were inefficient, as all the overwritten updates for each of the physical pages were processed in addition to the most recent update.

In sharp contrast, some of the embodiments described herein are able to implement an improved LPT recovery process. Rather than applying journal entries in the same order as they were originally implemented and logged to the LPT, the journal entries are preferably examined (as seen in operation 504) beginning with a most recent one of the journal entries in a most recent one of the journals and working towards an oldest one of the journal entries in an oldest one of the journals. In doing so, the most recent update to a LPT entry may be restored in the LPT after a loss while all other older (e.g., outdated) updates of the same LPT entry may be skipped over. As a result, only the most recent updates to the LPT are implemented in the repaired LPT, thereby negating the need to update the same LPT entry more than once.

According to a comparative example, which is in no way intended to limit the invention, but rather to better outline the improvements achieved by some of the embodiments described herein over conventional attempts, if an LPT entry has been updated four times since the most recent, valid snapshot, those four updates will be reflected in the journal entries. Under conventional attempts to repair the LPT from the snapshot and journal entries, the first (oldest) of the four updates would have been performed, followed by the second (second oldest) update, the third (third oldest) update, and finally the fourth (newest) update. Thus, three unnecessary updates would have been performed under a conventional attempt in order to achieve the fourth, most recent update.

Conversely, following the processes described in FIG. 5, the fourth update (newest) would have been applied to the given entry in the repaired LPT at the outset, whereby the third, second and first updates may be ignored in response to determining that they correspond to the same entry in the LPT, e.g., as will be described in further detail below. Thus, the processes described in the method of FIG. 5 desirably eliminates the three redundant updates which would have otherwise occurred under conventional attempts in view of the present example. By eliminating redundant updates, some of the embodiments described and/or suggested herein may be able to reduce wear experienced on memory cells and/or improve performance.

In order to avoid unnecessary (redundant) updates to the LPT, a flag is preferably used to keep track of which entries in the LPT have already been updated. Accordingly, with continued reference to FIG. 5, method 500 also includes inspecting a flag corresponding to a current LPT entry which corresponds to a currently examined journal entry. See operation 506. The flag may be used to indicate whether the current LPT entry has already been updated. Note that this flag has preferably been reset when the snapshot was restored, e.g., as explained above. Thus, as each journal entry is examined and the current logical page which corresponds to the currently examined journal entry is determined, a flag corresponding to that current logical page is preferably inspected to determine whether the current LPT entry for the logical page has already been updated. Again, a flag may be used to indicate whether each of the LPT entries have already been updated. Thus, by inspecting the flag, it may be determined whether the current LPT entry which corresponds to the flag has already been updated.

According to another approach, if it is determined that an earlier journal entry "touches" the same logical page of the LPT as a currently examined journal entry, operation 506 may include checking the flag (e.g., bit) to determine whether the entry at the current logical page has already been updated. If the entry at the current logical page has already been updated, the current journal entry may simply be discarded. As a result, no write operation is issued to memory. Accordingly, processing strain may be reduced as a flag may only be used when it is determined that a current journal entry corresponds to the same LPT entry as a previously updated journal entry, e.g., using a lookup table.

The flag configuration may be implemented differently depending on the desired embodiment. In one embodiment, the flags may be actively reset in response to some predefined criteria, such as one or more of: restoring a valid snapshot as seen in operation 502 above, a user request, meeting a predefined condition, after an amount of time has passed, etc. Moreover, the active reset may be accomplished by different means depending on the approach. For example, in some approaches the flags may be reset by passing a reset current through a bitmap, temporarily cutting a supply voltage to the flags, overwriting the flags, initializing the bitmap to the empty state, etc., as would be appreciated by one skilled in the art upon reading the present description.

However, in other embodiments the flags may be automatically reset upon losing power. In one example, which is in no way intended to limit the invention, the flags may be stored in a bitmap on RAM, e.g., with the LPT. According to one approach, the LPT entries may be collocated with the bitmap in the same location in memory, e.g., in DRAM. Thus, all flags in the bitmap may be reset to zero upon a power loss event, thereby automatically resetting the flags. Alternatively, each of the flags may be collocated with other LPT entry information (e.g., logical and physical address of the page). In other words, each memory location of an LPT entry may hold a flag, each of which may be reset when each of the LPT entries in the snapshot are restored by either explicitly resetting the flag using hardware, or restoring the LPT entry with the flag included in the snapshot entry, the flag having already been cleared at the time the snapshot was written.

It should also be noted that although the approaches described herein mention a "flag", this term is not intended to be limiting, but rather is presented by way of example only and a "flag" may include anything which is able to keep track of which entries have already been updated in the LPT. According various approaches, a flag may include a bit, a lookup table, an entry in a database, a log file, etc., to keep track of which entries have already been updated in the LPT.

In some embodiments, flags may be used in a "reduced bitmap" to represent a subset of the entries in the LPT table. Thus, this reduced bitmap of the LPT table may not hold all entries in the LPT table. Instead, the LPT entries may be added to the reduced bitmap, and the bitmap may be reorganized such that its size is reduced, depending on the desired approach. The LPT entries included in the reduced bitmap may have already been updated, and as a result, may be actively prevented from being updated again. That is, if an LPT entry is not present in the reduced bitmap, the update to the LPT table would be performed and the LPT entry would be added to the reduced bitmap as a result of the update to the LPT table being performed. Moreover, determining whether the current LPT entry has already been updated may include inspecting the reduced bitmap for the current LPT entry.

Adding a LPT entry to the reduced bitmap may trigger a reorganization and consolidation of entries in the reduced bitmap, for example by representing LPT entries using ranges of addresses. Therefore, subsequent updates to the LPT entries would still not be applied according to the given approach. It follows that, embodiments implementing flags in a reduced bitmap would functionally behave in the same way as the ones using the regular LPT update bitmap although the physical size of the reduced bitmap may be smaller than the regular LPT update bitmap.

Looking to decision 508, method 500 determines whether the current LPT entry corresponding to the currently examined journal entry has already been updated. As shown, method 500 proceeds to operation 510 in response to determining that the LPT entry has not already been updated. Operation 510 includes using the currently examined journal entry to update the current LPT entry which corresponds to the currently examined journal entry. In some approaches, updating the current LPT entry may include entering the physical address of a logical page stored in the journal entry into the location of the logical page in the corresponding LPT entry.

Moreover, operation 512 includes setting the flag which corresponds to the current logical page updated in operation 510 in response to using the journal entry to update the current LPT entry. Preferably, updating the current LPT entry in operation 510 and setting the flag in operation 512 are executed as a single, combined update to memory. It should be noted that "setting" and "resetting" a flag as described herein is in no way intended to limit the invention. Rather than setting a flag to indicate that a corresponding logical page has already been updated, the flag may equivalently be reset to indicate that a corresponding logical page has already been updated. Similarly, resetting a flag to indicate a corresponding logical page has not already been updated may equivalently be represented by setting the flag.

Method 500 may also return to operation 504 to examine another journal entry from the at least one journal after operation 512 is performed.

Returning to decision 508, method 500 proceeds to operation 514 in response to determining that the current LPT entry which corresponds to the logical page of the currently examined journal entry has already been updated, e.g., because a previous journal entry was applied. As shown, operation 514 includes discarding the currently examined journal entry, and the LPT is not updated as a result. According to some approaches, the journal entry may be passively discarded, e.g., ignored, in that no action is performed other than skipping over the particular journal entry. However, in other approaches a journal entry may be actively discarded, e.g., actually deleted from the journal, to free memory space, prevent future use of processing power to examine this journal entry again, etc. Again, it is preferred that only the most recent journal entry corresponding to a given physical page is applied because all previous updates are no longer relevant.

Method 500 may again return to operation 504 to examine another journal entry from the at least one journal after operation 514 is performed.

Looking to FIGS. 6A-6D, representative diagrams of process steps for restoring a snapshot from non-volatile random access memory using journal entries (e.g., see method 500 of FIG. 5 above) are illustrated in accordance with a system 600 according to one embodiment. As an option, the present system 600 may be implemented in conjunction with features from any other embodiment listed herein, such as those described with reference to the other FIGS., such as FIG. 5 and FIG. 1. Specifically, FIGS. 6A-6D include common components with the embodiment of FIG. 1. Accordingly, various components of FIGS. 6A-6D have common numbering with those of FIG. 1.

However, such system 600 and others presented herein may be used in various applications and/or in permutations which may or may not be specifically described in the illustrative embodiments listed herein. Further, the system 600 presented herein may be used in any desired environment. Thus FIGS. 6A-6D (and the other FIGS.) may be deemed to include any possible permutation.

Figure 6A:
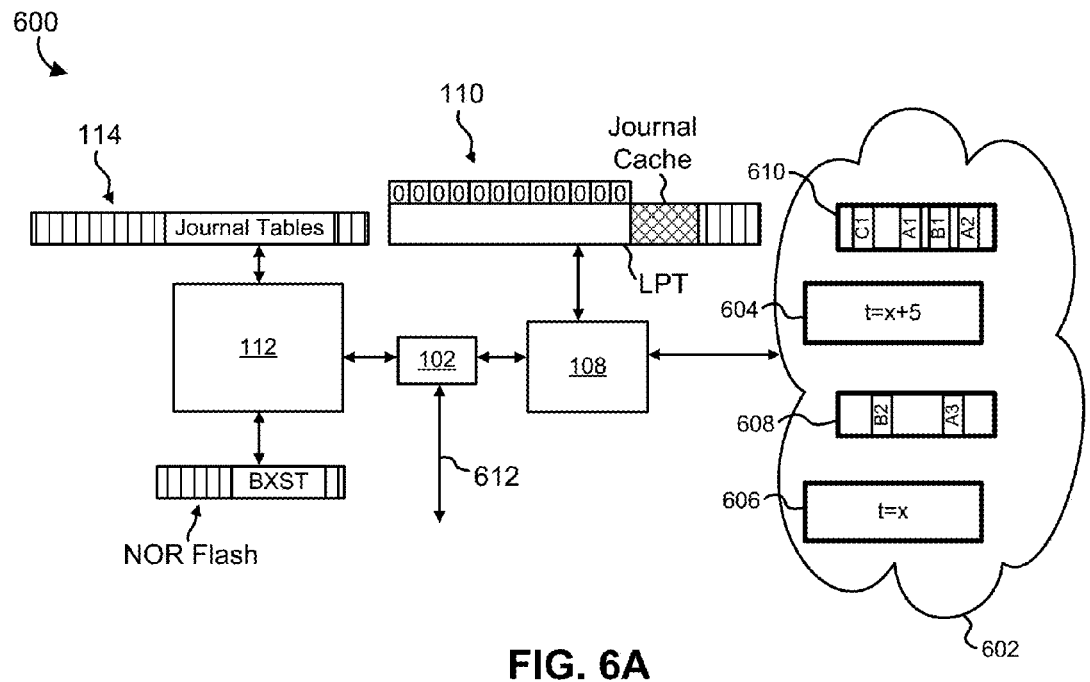
FIGS. 6A-6D are representational diagrams of processes performed on a system, in accordance with one embodiment.
Figure 6B:
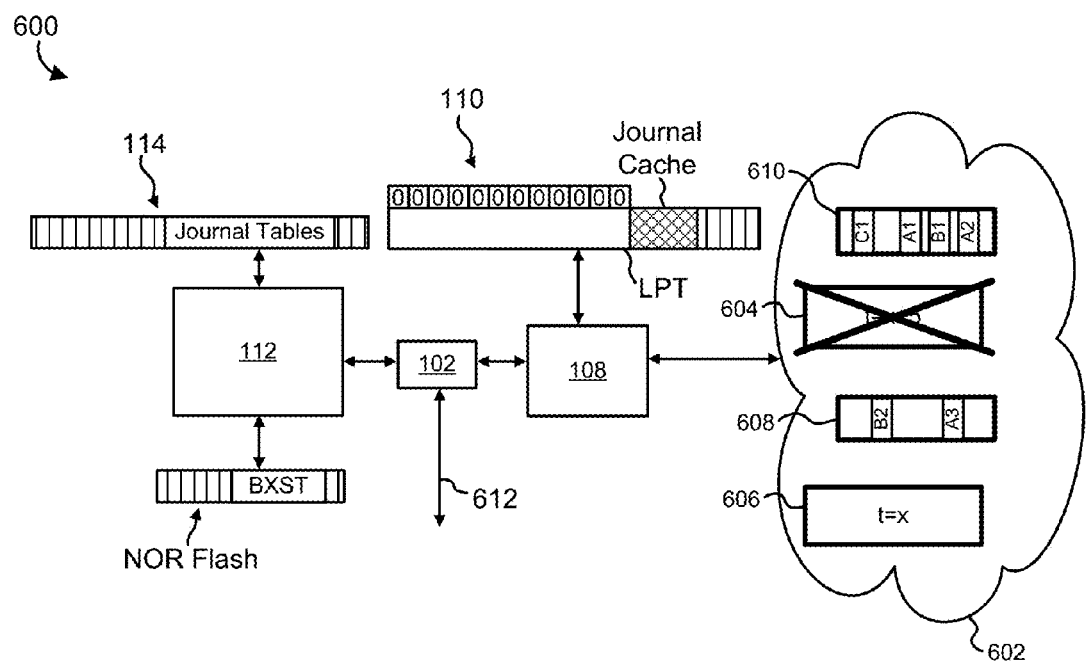

As shown in FIGS. 6A-6D, system 600 includes various components which are coupled to flash controller 108, including GPP 112 and GPP memory 114 having Journal Tables, flash controller memory 110 which holds the LPT and the Journal Cache, NOR Flash, and gateway 102. Gateway 102 may connect system 600 to a user interface, another system, a computer, etc., as indicated by arrow 612. Moreover, controller 108 is coupled to memory 602, which may include NVRAM, e.g., Flash memory. Looking now specifically to FIG. 6A, upon experiencing a power loss at t=x+6, the LPT, journal cache and bitmap lose the data stored therein. When power is restored, flash controller 108 accesses LPT snapshots and journals stored in memory 602, preferably to facilitate an accurate repair of the LPT. The LPT snapshot 604 initiated at t=x+5 has not yet been completed, and therefore is dropped (e.g., ignored, erased, etc.), as seen in FIG. 6B of the present example. Rather, previously completed LPT snapshot 606 initiated at t=x is restored in the LPT. The restore procedure may also ensure that the flags for each LPT entry are reset.

Furthermore, journal 608 initiated at t=x+5 is examined by the controller 108 first, as it is a more recent journal than journal 610 initiated at t=x. Moreover, the controller 108 begins with a most recent journal entry in journal 608 initiated at t=x+5 and moves towards an oldest journal entry therein (represented by arrow 650). Accordingly, journal entry A3 is examined first, followed by journal entry B2.

Figure 6C:
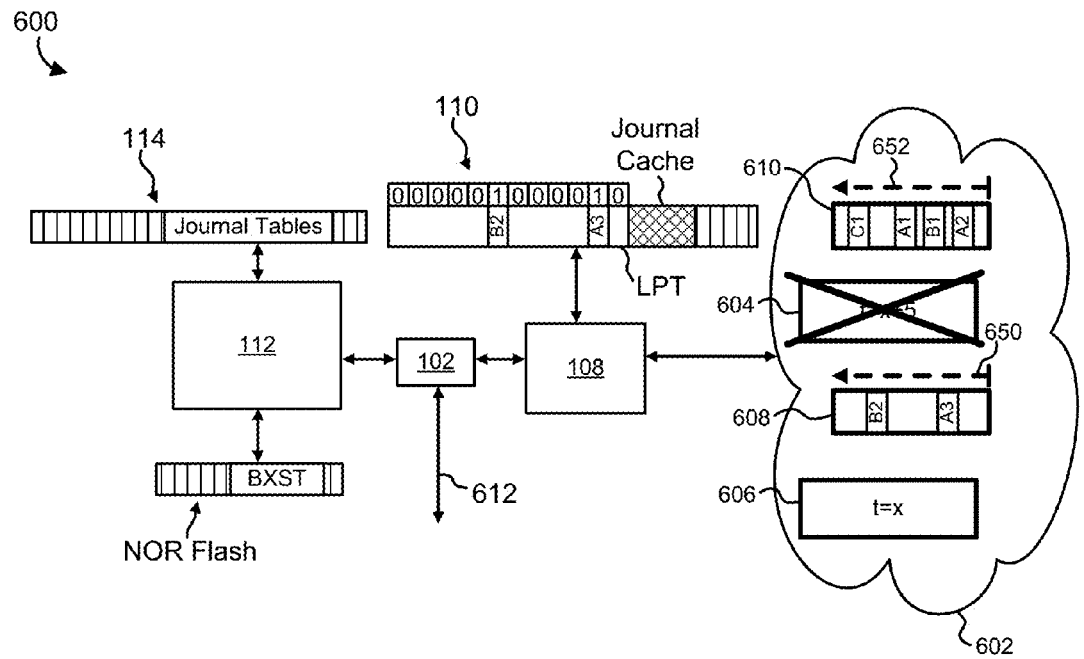

In response to determining that a flag at the LPT entry corresponding to journal entry A3 (LPT entry A) has not been set, journal entry A3 is used to update the LPT entry as illustrated in the LPT of FIG. 6C. Moreover, in response to updating the LPT entry corresponding to journal entry A3, the flag associated therewith is set to "1". Similarly, a flag at the LPT entry corresponding to journal entry B2 (LPT entry B) has not been set, and therefore journal entry B2 is used to update the LPT entry, and the flag is set as shown.

After all journal entries of journal 608 initiated at t=x+5 have been examined, flash controller 108 looks to the older journal 610 initiated at t=x, beginning with a most recent journal entry therein and moving towards an oldest journal entry (represented by arrow 652). Flash controller 108 also examines journal 610 because the journal had not been completed at the point in time snapshot 606 had been started. According to the present example, journal entry A2 is the most recent journal entry in journal 610, and therefore is examined first. Upon determining that journal entry A2 corresponds to the same LPT entry as previously updated journal entry A3, flash controller 108 skips over journal entry A2 and moves to the next most recent journal entry. Accordingly, journal entry B2 is examined and ultimately skipped in view of the flag set at LPT entry B in the LPT, followed similarly by journal entries A2 and A1.

Figure 6D:
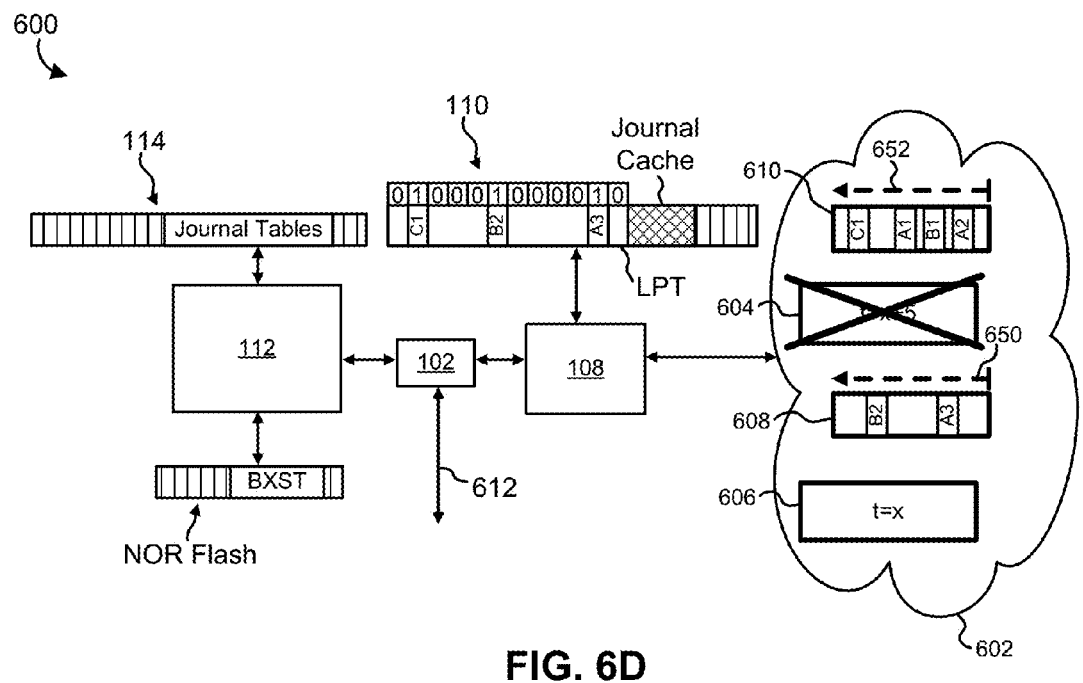

However, looking now to FIG. 6D, upon examining the oldest journal entry C1 in journal 610 and determining that the LPT entry corresponding thereto has not yet been updated, flash controller 108 preferably implements the update at the LPT entry corresponding to journal entry C1 in the LPT (LPT entry C) and sets the flag corresponding thereto.

It follows that the journal(s) being examined when restoring a snapshot include any journal that has not been completed at a point in time that the last valid snapshot was initiated. Thus, the journal(s) being examined include all journal entries entered between the point in time that the valid snapshot was initiated and a current point in time. Therefore, it is preferred that all journals not completed by the point in time that the most recent, valid LPT snapshot was initiated are examined when restoring an LPT as described above. Thus, the at least one journal examined above with reference to FIGS. 6A-6D was not completed at a point in time that the valid snapshot 606 was started (at time "x"). Moreover, the at least one journal includes all journal entries entered between the point in time that the valid snapshot was started (at time "x"), and a current point in time.

Figure 6E:
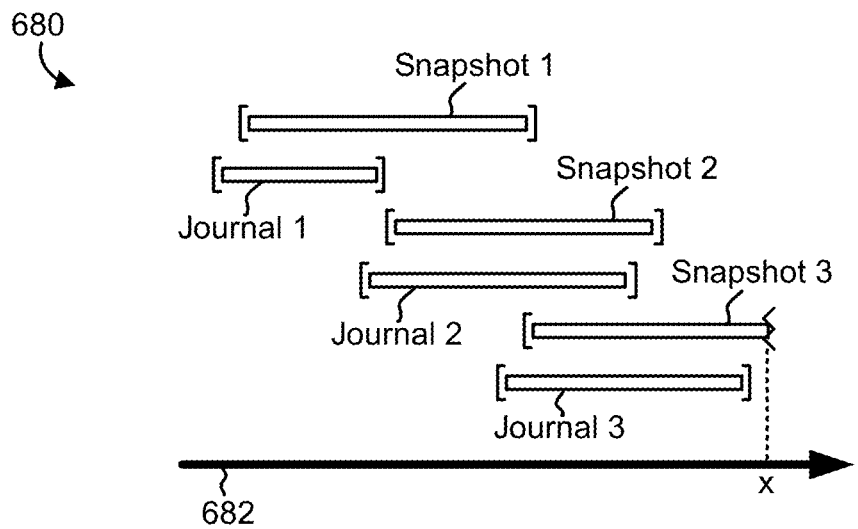
FIG. 6E is a representational diagram of events occurring along a timeline, in accordance with one embodiment.
Figure 6F:
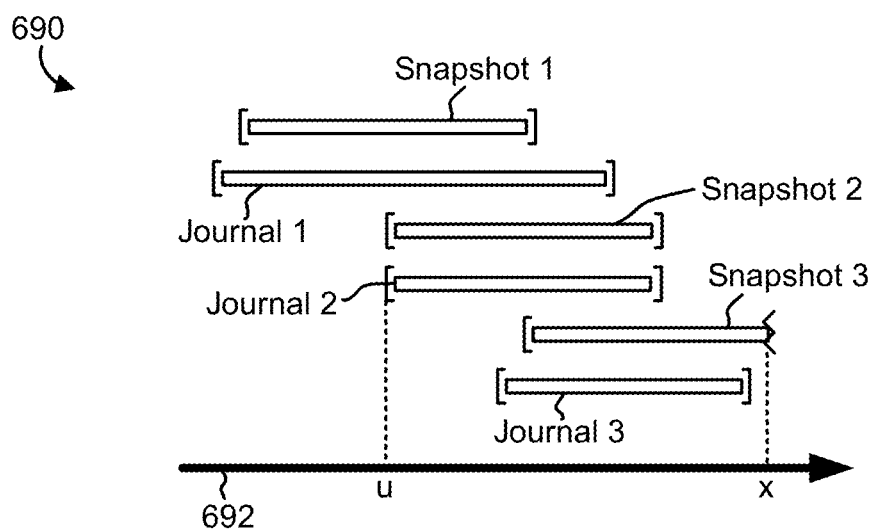
FIG. 6F is a representational diagram of events occurring along a timeline, in accordance with one embodiment.

Looking to FIGS. 6E-6F, representational diagrams 680, 690 of events occurring along timelines 682, 692 are illustrated in accordance with two different embodiments. As an option, the present diagrams 680, 690 may be implemented in conjunction with features from any other embodiment listed herein, such as those described with reference to the other FIGS., such as FIGS. 5-6D. However, such diagrams 680, 690 and others presented herein may be used in various applications and/or in permutations which may or may not be specifically described in the illustrative embodiments listed herein. Further, the diagrams 680, 690 presented herein may be used in any desired environment.

Timeline 682 of diagram 680 in FIG. 6E, shows a plurality of snapshots and journals which initiate and finish at different points in time, as well as a power loss event at time "x". Snapshot 3 did not finish by the time the power loss at time "x" occurred, and therefore Snapshot 2 is preferably restored. The journals examined in order to restore Snapshot 2 include Journal 3 and Journal 2, but not Journal 1, as Journal 1 had completed by the time Snapshot 2 was initiated, and therefore all journal entries in Journal 1 have already been implemented in Snapshot 2.

Looking now to timeline 692 of diagram 690 in FIG. 6F, again a plurality of snapshots and journals are included, as well as a power loss event at time "x". Snapshot 3 did not finish by the time the power loss at time "x" occurred, and therefore Snapshot 2 is preferably restored. In the present example, Journal 2 and Journal 3 start later in time than the point in time which Snapshot 2 was initiated, and therefore are examined as described in the previous example (e.g., see FIG. 6E). However, Journal 1 is also preferably examined in the present example, as it had not been completed by the point in time Snapshot 2 had been initiated. Therefore, all three journals Journal 1, Journal 2, Journal 3 are preferably examined to restore Snapshot 2.

However, because Journal 1 includes journal entries which correspond to points in time prior to the initiation of Snapshot 2, it is preferred that only the journal entries which correspond to a point in time after Snapshot 2 was initiated at time "u". Thus, journal entries which correspond to a point in time prior to time "u" are preferably not examined (e.g., ignored) while restoring Snapshot 2.

Again, with respect to a particular snapshot that had been restored, any journal that has not been completed at the point in time the present snapshot was initiated is preferably examined (e.g., replayed) because those journals may include journal entries which are relevant updates to the present snapshot. It should be noted that the start and end points of snapshots and journals shown in FIGS. 6E and 6F have been chosen to best exemplify which journals are preferably examined for illustrative embodiments which are in no way intended to limit the invention. For example, in preferred embodiments, a current journal is terminated and a new journal is initiated when a snapshot completes. Moreover, it is preferred that only one snapshot is being executed at any given point in time. Thus, it only a single journal may be ongoing at any given point in time.

It follows that the embodiments described herein may be able to restore an LPT from journal entries more efficiently than conventionally achievable. By implementing flags (e.g., bits) capable of indicating whether an LPT entry has already been created or updated in response to implementing a journal entry, redundancy may desirably be avoided, thereby improving efficiency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 7:
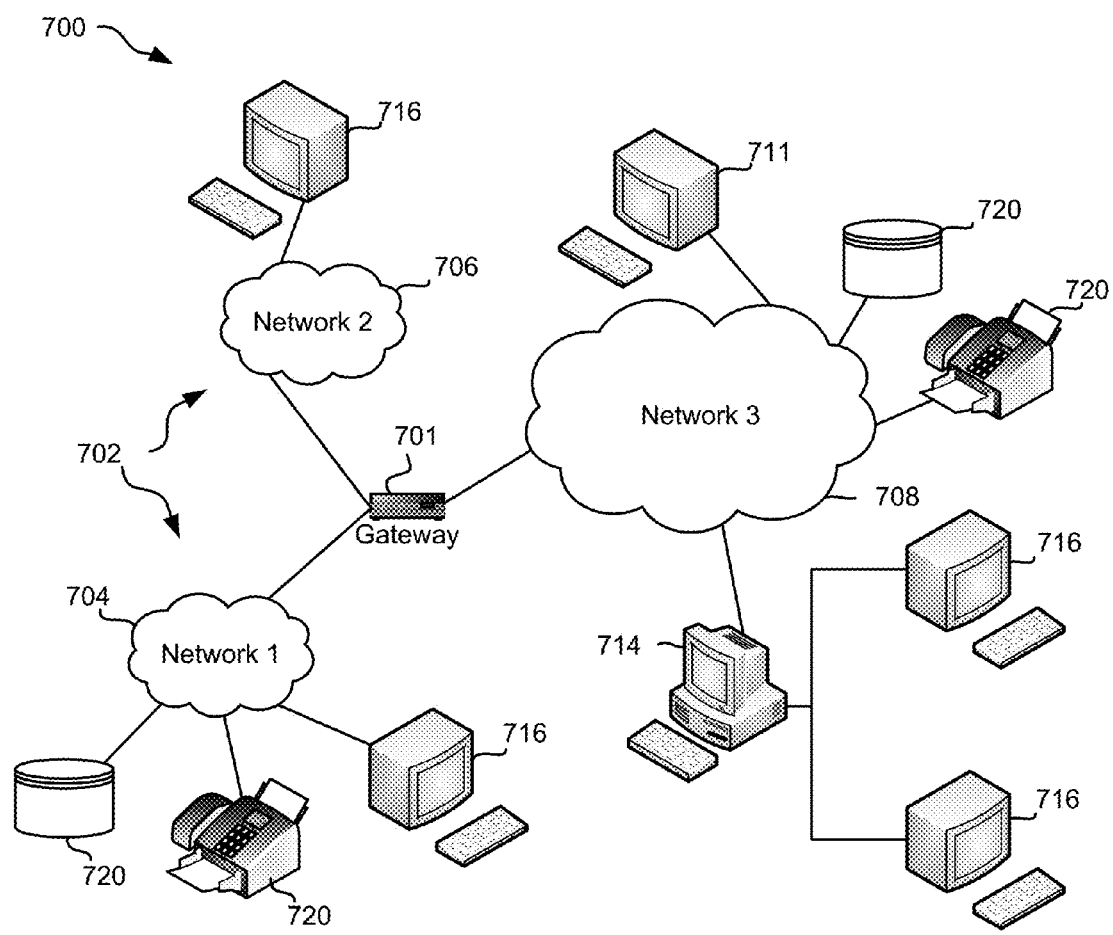
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
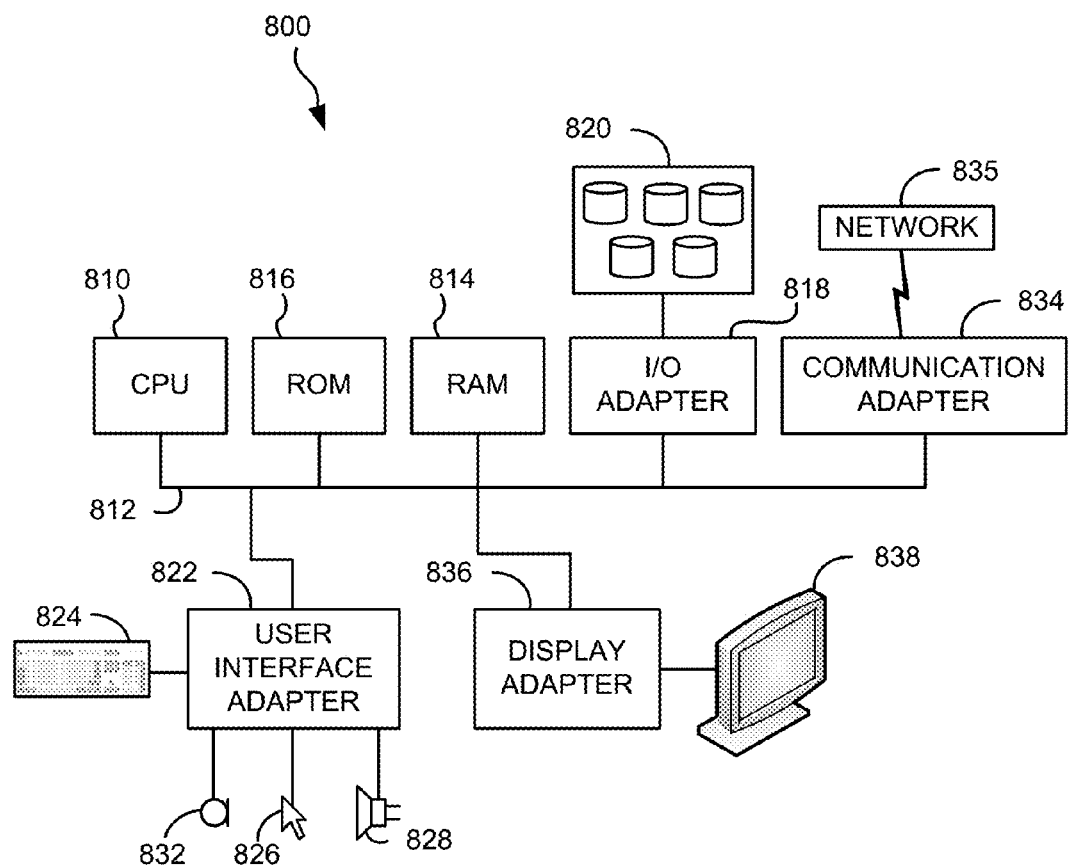
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the approaches described above with reference to the one or more processors 210 of FIG. 2.

The processor system 800 shown in FIG. 8 includes RAM 814, Read Only Memory (ROM) 816, and an I/O adapter 818. According to some embodiments, which are in no way intended to limit the invention, I/O adapter 818 may include any of the approaches described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having NVRAM memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 9:
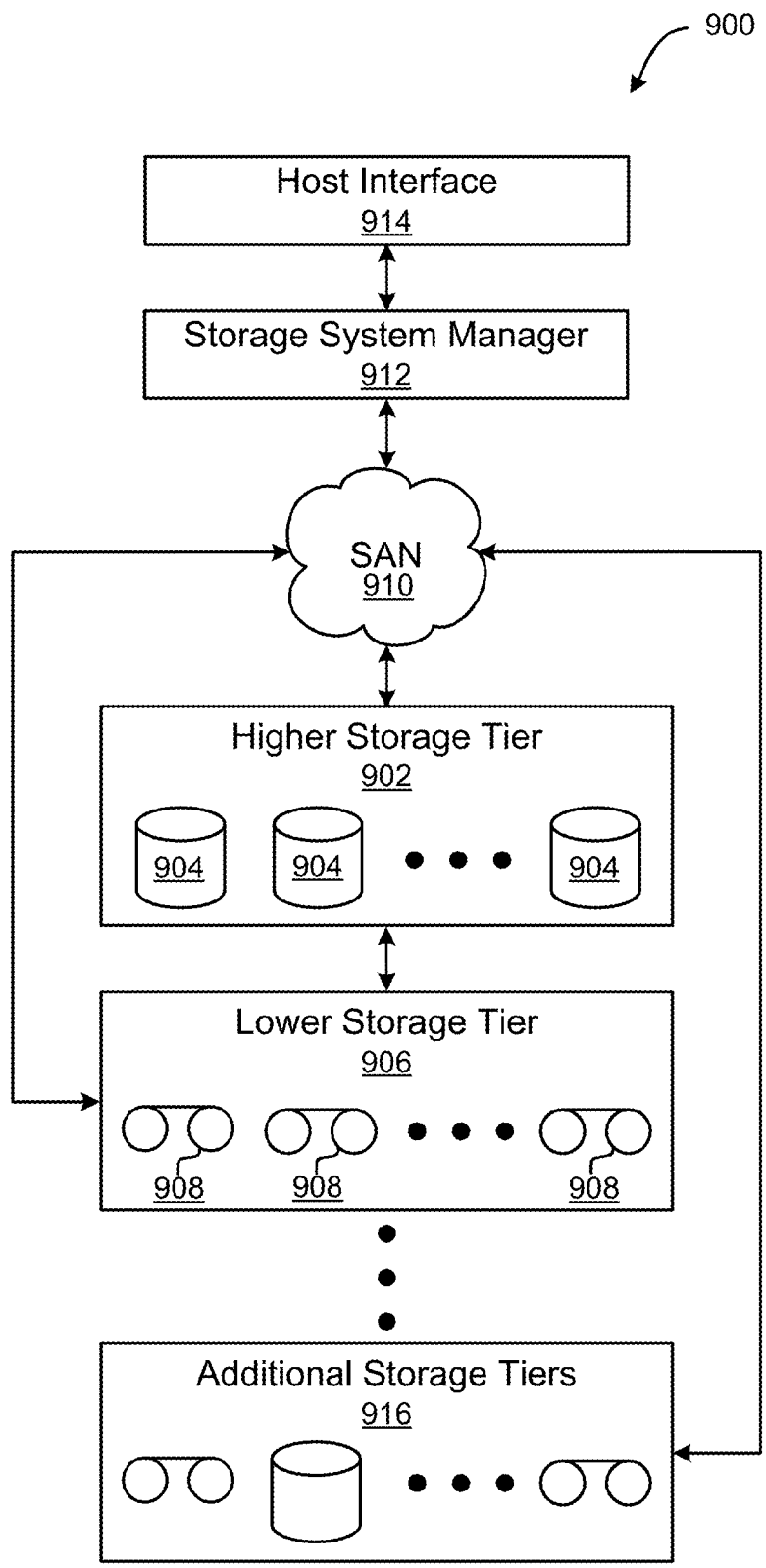
FIG. 9 is a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other approaches, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus the one or more additional storage tiers 916 may, in some approaches, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:

1. A controller-implemented method for restoring a snapshot from non-volatile random access memory using journal entries, comprising:
   restoring, by the controller, a valid snapshot of a logical to physical table (LPT) from the non-volatile random access memory;
   examining, by the controller, each of a plurality of journal entries from at least one journal beginning with a most recent one of the journal entries in a most recent one of the at least one journal and working towards an oldest one of the journal entries in an oldest one of the at least one journal, the journal entries corresponding to one or more updates made to one or more entries of the LPT;
   determining, by the controller, whether a current LPT entry which corresponds to a currently examined journal entry has already been updated;
   using, by the controller, the currently examined journal entry to update the current LPT entry in response to determining that the current LPT entry has not already been updated; and
   discarding, by the controller, the currently examined journal entry in response to determining that the current LPT entry has already been updated.

2. The method of claim 1, wherein the journal entries include a physical address and a logical address.

3. The method of claim 1, wherein a flag is used to indicate whether each of the LPT entries have already been updated, wherein determining whether the current LPT entry has already been updated includes inspecting a flag corresponding to the current LPT entry.

4. The method of claim 3, wherein updating the current LPT entry includes setting the flag corresponding to the current LPT entry.

5. The method of claim 1, wherein flags are used to represent a subset of the LPT entries in a reduced bitmap, wherein determining whether the current LPT entry has already been updated includes inspecting the reduced bitmap for the current LPT entry.

6. The method of claim 1, wherein the at least one journal is stored in the non-volatile random access memory.

7. The method of claim 1, wherein the non-volatile random access memory is Flash memory.

8. A computer program product for restoring a snapshot from non-volatile random access memory using journal entries, the computer program product comprising a computer readable storage medium having program instructions embodied therewith, the program instructions readable and/or executable by a controller to cause the controller to:
   restore, by the controller, a valid snapshot of a logical to physical table from the non-volatile random access memory;
   examine, by the controller, each of a plurality of journal entries from at least one journal beginning with a most recent one of the journal entries in a most recent one of the at least one journal and working towards an oldest one of the journal entries in an oldest one of the at least one journal, the journal entries corresponding to one or more updates made to one or more entries of the logical to physical table;
   determine, by the controller, whether a current LPT entry which corresponds to a currently examined journal entry has already been updated;
   use, by the controller, the currently examined journal entry to update the current LPT entry in response to determining that the current LPT entry has not already been updated; and
   discard, by the controller, the currently examined journal entry in response to determining that the current LPT entry has already been updated.

9. The computer program product of claim 8, wherein the journal entries include a physical address and a logical address.

10. The computer program product of claim 8, wherein a flag is used to indicate whether each of the LPT entries have already been updated, wherein determining whether the current LPT entry has already been updated includes inspecting a flag corresponding to the current LPT entry.

11. The computer program product of claim 10, wherein updating the current LPT entry includes setting the flag corresponding to the current LPT entry.

12. The computer program product of claim 10, wherein the flags are reset in response to restoring a valid snapshot.

13. The computer program product of claim 8, wherein the at least one journal is stored in the non-volatile random access memory.

14. The computer program product of claim 8, wherein the non-volatile random access memory is Flash memory.

15. A system, comprising:
   a plurality of non-volatile random access memory blocks configured to store data; and
   a controller and logic integrated with and/or executable by the controller for restoring a snapshot from non-volatile random access memory using journal entries, the logic being configured to:
      restore, by the controller, a valid snapshot of a logical to physical table from the non-volatile random access memory;
      examine, by the controller, each of a plurality of journal entries from at least one journal beginning with a most recent one of the journal entries in a most recent one of the at least one journal and working towards an oldest one of the journal entries in an oldest one of the at least one journal, the journal entries corresponding to one or more updates made to one or more LPT entries of the logical to physical table;
      inspect, by the controller, a flag corresponding to a current LPT entry which corresponds to a currently examined journal entry, the flag indicating whether the current LPT entry has already been updated;
      determine, by the controller, whether the current LPT entry has already been updated;
      use, by the controller, the currently examined journal entry to update the current LPT entry in response to determining that the current LPT entry has not already been updated;
      set, by the controller, the flag in response to using the currently examined journal entry to update the current LPT entry; and
      discard, by the controller, the currently examined journal entry in response to determining that the current LPT entry has already been updated, wherein the journal entries include a physical address and a logical address, wherein the at least one journal is stored in the non-volatile random access memory.

16. The system of claim 15, wherein the flags are stored in a bitmap.

17. The system of claim 15, wherein the journal(s) being examined include any journal that has not been completed at a point in time that the valid snapshot is initiated, thereby including all journal entries entered between the point in time that the valid snapshot was initiated and a current point in time.

18. The system of claim 15, wherein the flags are actively reset in response to restoring a valid snapshot.

19. The system of claim 15, wherein the flags are automatically reset upon losing power.

20. The system of claim 15, wherein the non-volatile random access memory is Flash memory.

\* \* \* \* \*